(12) United States Patent
Kiffmeyer et al.

(10) Patent No.: US 9,725,149 B2
(45) Date of Patent: Aug. 8, 2017

(54) PEDAL PROPELLED WATERCRAFT WITH ACCESSORY MOUNT

(71) Applicant: Legacy Paddlesports LLC, Fletcher, NC (US)

(72) Inventors: John Kiffmeyer, Asheville, NC (US); Bryon Phillips, Hendersonveille, NC (US); Chris Erdahl, Asheville, NC (US); Shane Benedict, Flat rock, NC (US)

(73) Assignee: Legacy Paddlesports LLC, Fletcher, NC (US)

( * ) Notice: Subject to any disclaimer, the term of this patent is extended or adjusted under 35 U.S.C. 154(b) by 93 days.

(21) Appl. No.: 14/692,119

(22) Filed: Apr. 21, 2015

(65) Prior Publication Data

US 2016/0075420 A1  Mar. 17, 2016

Related U.S. Application Data

(60) Provisional application No. 61/983,359, filed on Apr. 23, 2014.

(51) Int. Cl.
*B63H 16/20* (2006.01)
*B63B 35/71* (2006.01)
*B62M 3/00* (2006.01)

(52) U.S. Cl.
CPC ............ *B63H 16/20* (2013.01); *B62M 3/003* (2013.01); *B63B 2035/715* (2013.01); *B63H 2016/202* (2013.01)

(58) Field of Classification Search
CPC .. B63H 16/08; B63H 2016/085; B63H 16/12; B63H 16/14; B63H 16/20; B63H 2016/202; B62M 3/003
See application file for complete search history.

(56) References Cited

U.S. PATENT DOCUMENTS

| | | | |
|---|---|---|---|
| 1,473,049 A * | 11/1923 | Roberts ................. | B63H 16/14 440/31 |
| 3,807,347 A | 4/1974 | Baldwin ................... | 115/41 R |
| 4,226,206 A | 10/1980 | Wilson ..................... | 440/112 |
| 4,252,384 A * | 2/1981 | Duvoisin ............... | B62K 19/34 384/431 |
| 4,459,116 A * | 7/1984 | Moore .................... | B63B 35/73 114/283 |
| 5,460,551 A | 10/1995 | Beres ....................... | 440/27 |
| 6,280,267 B1 | 8/2001 | Griffith, Sr. et al. ........ | 440/53 |
| 8,393,794 B1 * | 3/2013 | Shiraishi ................ | B62K 19/34 384/458 |
| 2009/0042461 A1 * | 2/2009 | Walton ................... | B63B 35/71 440/6 |

* cited by examiner

*Primary Examiner* — Andrew Polay
(74) *Attorney, Agent, or Firm* — MacCord Mason PLLC (57) ABSTRACT

A watercraft having a propulsion device accessible from within its cockpit. The propulsion device includes a pedaling assembly with seals to prevent ingress of water to the interior of the device's housing. The propulsion device may also include an accessory mount for a person to easily see and access electronic equipment and thereby keep the hands free for other tasks.

20 Claims, 7 Drawing Sheets

PEDAL PROPELLED WATERCRAFT WITH ACCESSORY MOUNT

FIELD OF THE INVENTION

The present invention relates generally to watercraft and, more particularly, to a watercraft having a propulsion device built with improved waterproofing and capable of mounting accessories.

BACKGROUND OF THE INVENTION

People use personal watercraft such as kayaks and canoes for recreational activities including fishing, bird-watching, sight seeing, and the like. A traditional kayak or canoe, however, must be manually propelled using a paddle or oars. When a person is fishing in a kayak or canoe, handling a paddle or oars can prevent a person from simultaneously handling a fishing rod or other fishing gear. Similarly, when a person is bird-watching or sight seeing in a kayak or canoe, handling paddles or oars can prevent a person from simultaneously handling binoculars, maps, guidebooks, and the like. In addition, even when a paddle or oars are not being used by a paddler, having a paddle or oars onboard can sometimes interfere with the person's non-paddling activities.

Watercraft with pedal-operated propulsion devices installed overcome issues arising from having to handle a paddle or oars. A pedal propulsion device enables a person to operate the watercraft with his/her feet while having one or both hands free. Pedal propulsion devices also offer a recreational alternative to traditional paddling methods.

However, prior versions of pedaled boats suffer leakage in the pedaling assembly, breakage at connection points between the pedal assembly and the boat propeller. One area that has been found to be susceptible to the ingress of water is where the crankarms of a pedal are installed onto the propulsion device housing. Thus, there is a need for preventing water from entering into pedal propulsion devices.

Moreover, while the hands are free with the use of a pedal-operated watercraft, a person may wish to use other equipment, particularly electronic devices, in conjunction with various recreational activities. For example, a person may want to use a chartplotter or sonar radar while fishing on a watercraft. Current watercraft do not provide a convenient method of mounting such equipment for easy accessibility and visibility, or hands-free viewing. Accordingly, there still remains a need for the watercraft to easily accommodate accessories that may be used during various recreational activities.

SUMMARY OF THE INVENTION

The present invention fulfills one or more of these needs in the art by providing a watercraft having a hull with a cockpit and a propulsion device accessible from within the cockpit. The propulsion device includes a housing with an interior and an exterior, the interior having at least two openings accessible to the exterior. A pedaling assembly is mounted in the interior and extends through the openings to left and right pedals. A transmission engages a propeller assembly when the pedals are rotated by a user.

In one embodiment, the pedaling assembly includes seals to prevent ingress of water into the housing. For example, the openings may be closed with caps each having an internal seal. The caps may also further include an exterior seal.

In another embodiment, an accessory adapter is included on the exterior of the housing for mounting an accessory. Examples of accessories that may be mounted with the adapter include electronic devices such as chartplotters, radios and sonar radars. These accessories may be mounted onto a threaded hole of the housing.

These and other aspects of the present invention will become apparent to those skilled in the art after a reading of the following description of the preferred embodiment when considered with the drawings.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
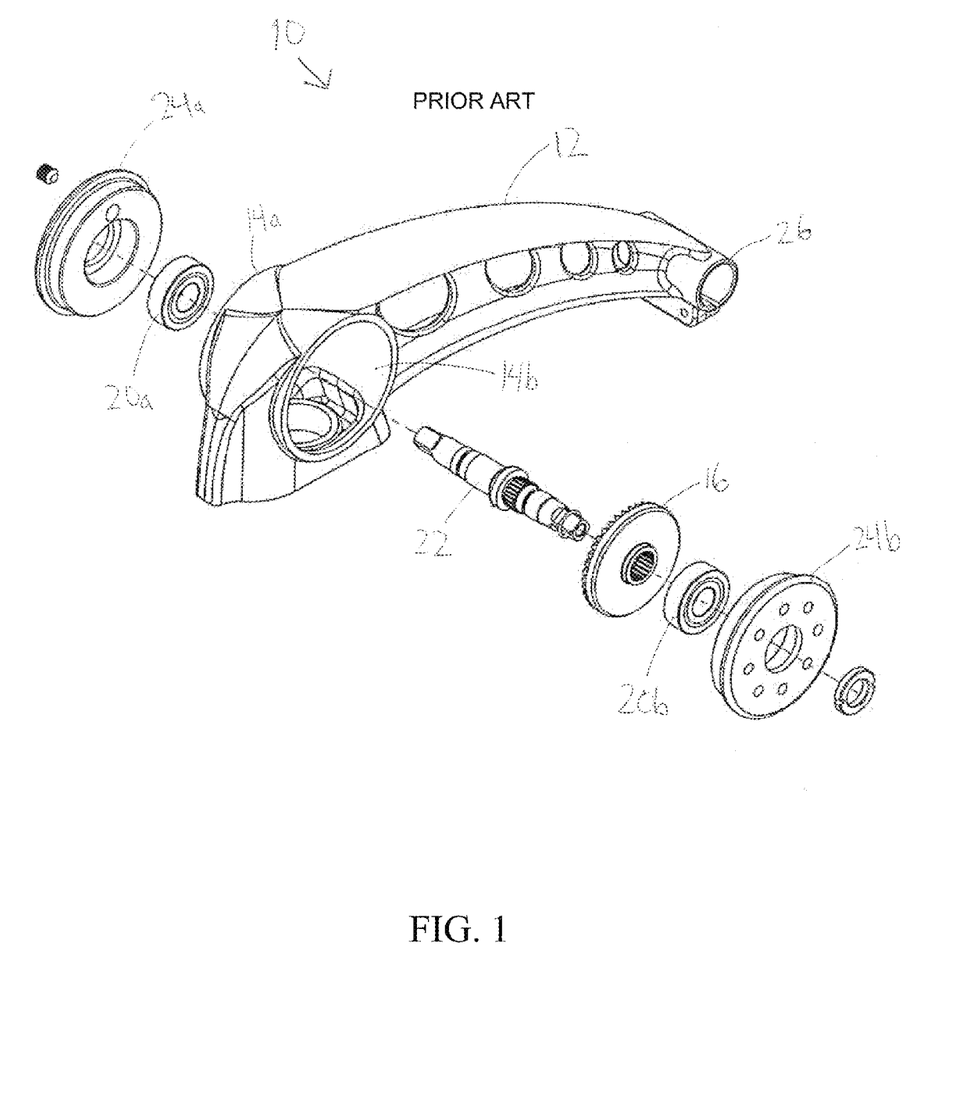
FIG. 1 is an exploded view of a prior art upper assembly of a pedal structure connecting to a boat propeller.

The current invention allows for an improved pedal propulsion device. One embodiment prevents leakage of water into the pedaling assembly and enables users to conveniently mount accessories to the device. An example of a pedal propulsion device found in the prior art is depicted in FIG. 1. FIG. 1 shows a top portion 12 of a pedal propulsion device 10 lacking a means to mounting accessories. The pedal propulsion device 10 includes two openings, 14a and 14b, revealing the interior of top portion 12. The interior contains a gear 16 and two bearings, 20a and 20b, on opposing faces of gear 16. A pedal spindle 22 is inserted through the gear 16 and bearings 20a, 20b. The ends of pedal spindle 22 extend through openings 14a, 14b. Openings 14a and 14b are closed with caps 24a and 24b at each respective end. The other end of top portion 12 includes a thwart tube connector 26 that opens and closes independently of the device 10 (i.e., the connector 26 attaches to device 10 only at distinct points).

Caps 24a and cap 24b in the prior art do not prevent ingress of water into the interior of pedal propulsion device 10. Nor do the pedal propulsion devices in the prior art include an accessory mount.

Figure 2A:
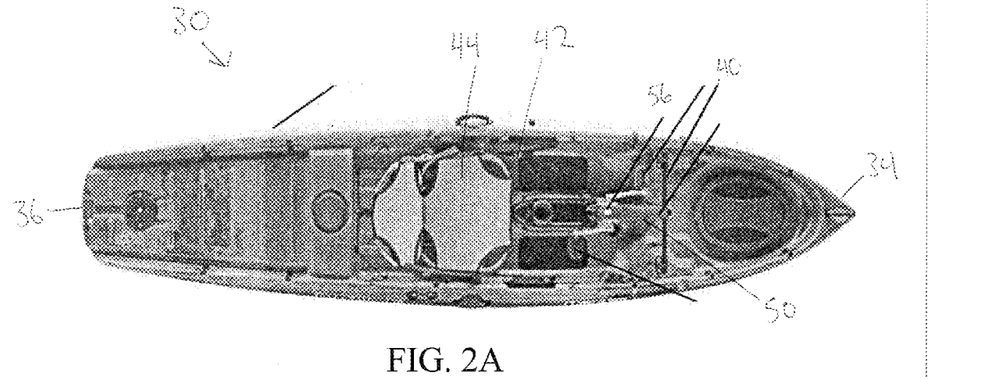
FIG. 2A is a top plan view of a kayak utilizing a pedal and propeller assembly as disclosed herein.
Figure 2B:
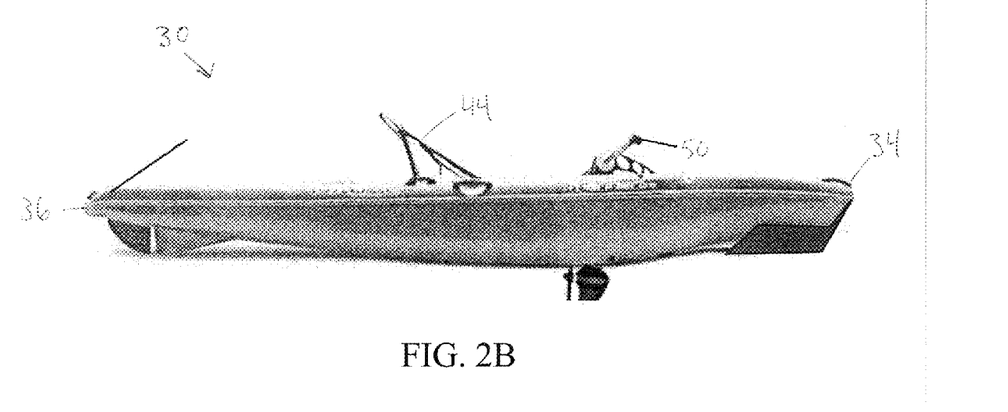
FIG. 2B is a side view of the kayak of FIG. 2A.

FIGS. 2A and 2B shows one embodiment of the present disclosure, depicting a watercraft 30 having a pedal propulsion device 50. In FIGS. 2A and 2B, the watercraft 30 is a kayak having a hull with a bow 34 and a stern 36. Opposed sidewalls extend between the bow and the stern, with at least one thwart 40 extending between the interior of the sidewalls for structural support. Thwarts act also as used as a binding post, so that a paddler's gear can be tied to the thwart. The hull also includes a cockpit 42 between the bow 34 and the stern 36. In the embodiment shown in FIGS. 2A and 2B, the cockpit 42 includes a seat 44 and a pedal propulsion device 50. As shown in FIG. 2A, the pedal propulsion device 50 may include an accessory mount 56 for mounting accessories. The seat 44 and device 50 are positioned in the cockpit so that a user can sit in the seat and rotate pedals of the device 50 with his or her feet.

Figure 3:
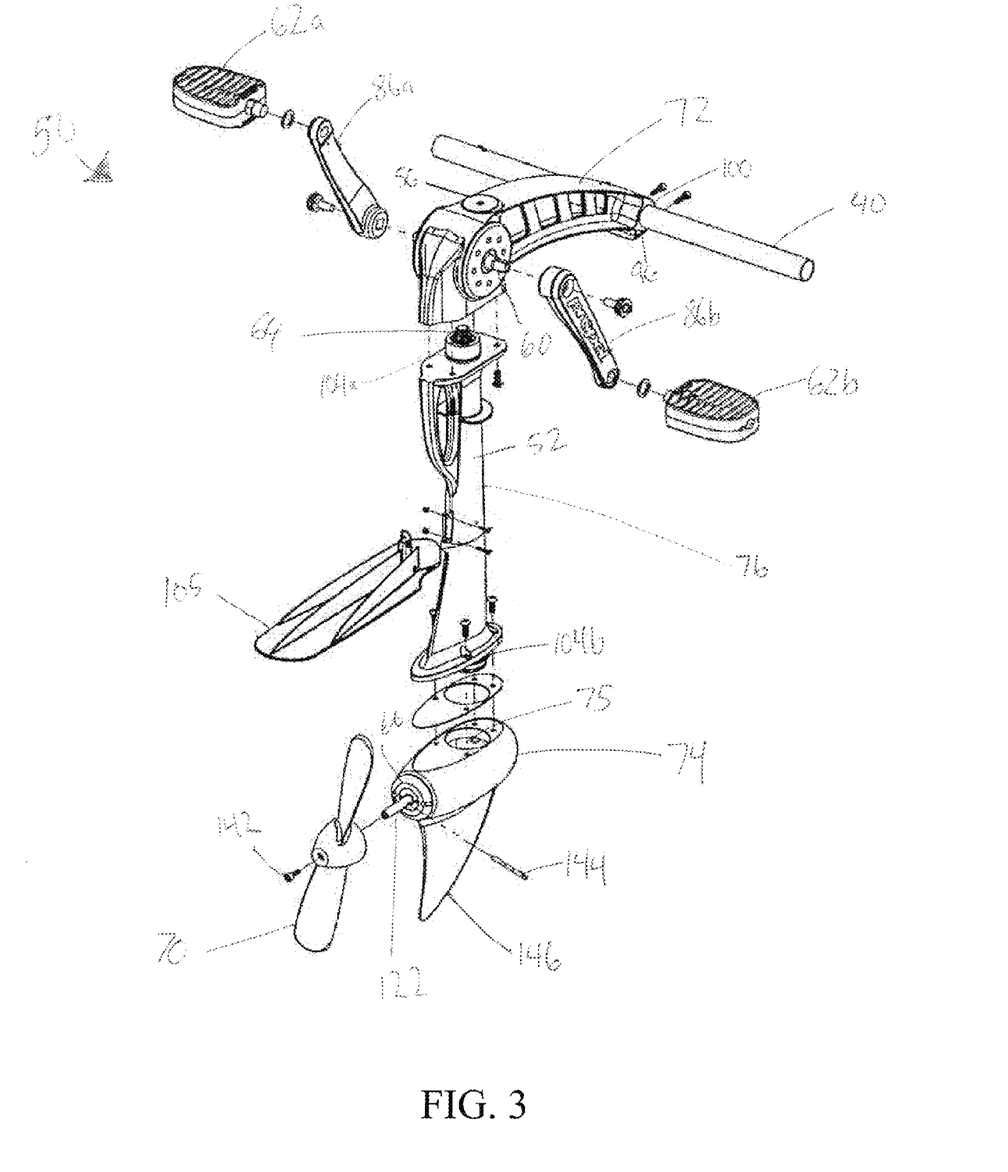
FIG. 3 is an exploded view of a perspective propulsion unit that can be installed in the kayak of FIG. 2.
Figure 4:
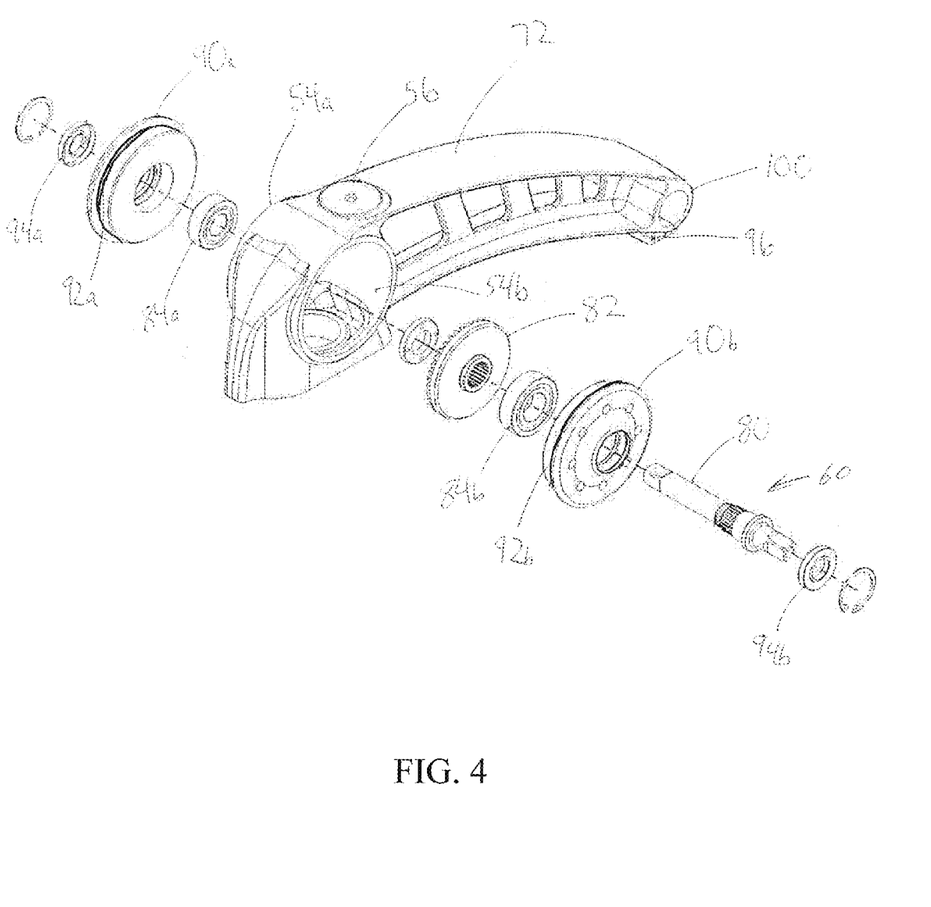
FIG. 4 is an exploded view of a top shell assembly for the kayak propulsion unit of FIG. 3.

FIGS. 3 and 4 show a propulsion device 50 in accordance with an embodiment of the invention. The propulsion device 50 includes a housing 52 with an interior and an exterior. The interior may have at least two openings, 54a and 54b, accessible to the exterior. The exterior may also include an accessory adapter 56 for mounting an accessory. The propulsion device 50 also includes a pedaling assembly 60 mounted in the interior and extending through the openings for the left and right pedals 62a and 62b to attach.

A transmission 64 is located in the interior of the housing 52, and connects to the pedaling assembly 60 as well as a propeller assembly 66. As a user rotates the pedals 62, the transmission 64 transmits the rotation downward from the pedaling assembly 60 to the propeller assembly 66. The propeller assembly 66 in a lower portion of the interior includes a propeller 70 mounted on the exterior of the housing 52, so that when the propulsion device 50 is installed in a watercraft, pedaling causes the watercraft to propel through water.

In one embodiment, the housing 52 of propulsion device 50 may be comprised as a single piece. However, in other embodiments, the housing 52 may be comprised of multiple components. In some embodiments, including the one shown in FIG. 3, the housing 52 is comprised of a top shell assembly 72, a bottom shell assembly 74, and a central shell assembly 76. In the embodiment shown in FIG. 3, each shell assembly has a top and a bottom, wherein the top of the center shell assembly 76 connects to the bottom of the top shell assembly 72, and the bottom of the center shell assembly 76 connects to the top of the bottom shell assembly 74. Center shell assembly 76 may further include gaskets and/or O-rings to help seal the interface between the shell assemblies. As seen in FIG. 3, each shell may further include one or more interior cavities so that the assembled housing forms a continuous interior cavity. When propulsion device 50 is installed onto a watercraft having a cockpit, the central shell assembly 76 may extend through a hole in the cockpit such that the top shell assembly 72 is above the hole in the cockpit and the bottom assembly 74 is below the hole in the cockpit.

Figure 5:
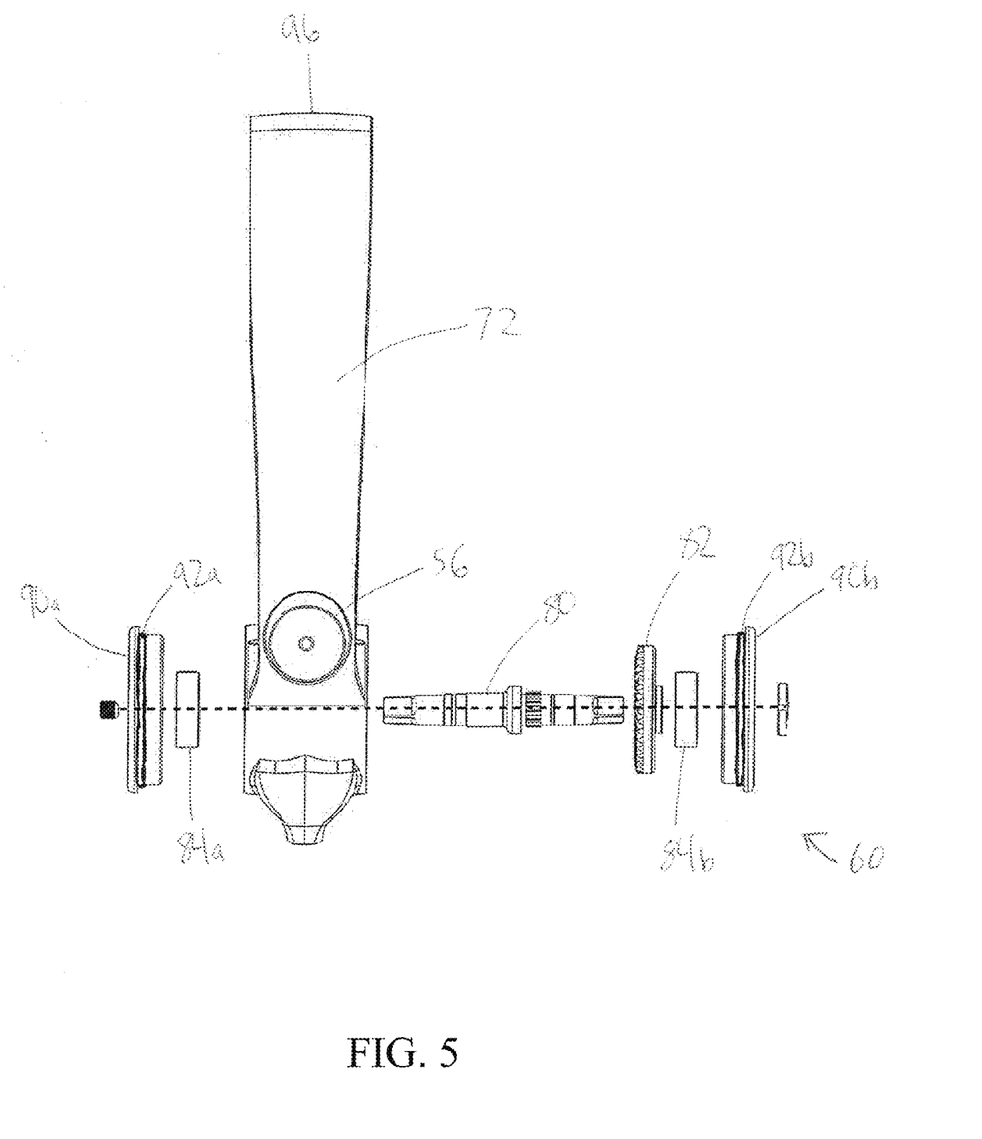
FIG. 5 is an exploded view of a pedaling assembly associated with the top shell assembly of the kayak propulsion unit of FIG. 3.

FIG. 4 is an exploded perspective view of the top shell assembly 72 from the embodiment shown in FIG. 3. FIG. 5 is the exploded top view of the top shell assembly 72 from a top-down perspective. The top shell assembly 72 includes two openings, 54a and 54b, making a through-passage way accessible to the exterior. Top shell assembly 72 also includes a pedaling assembly 60 mounted in the interior and extending through the openings for the crankarms 86a and 86b of the left and right pedals 62a and 62b to attach. As best seen in FIG. 5, the pedaling assembly 60 includes a pedal spindle 80 having two ends, and inserted through a gear 82 bearings 84a and 84b support the spindle in the passage way between the openings 54a and 54b. Crankarms 86a and 86b each perpendicularly connect to an end of pedal spindle 80 at the crankarm's inner end. Each crankarm 86 also includes an outer end attached to one of the pedals 62.

The openings 54a and 54b may be closed with a cap 90a and 90b on each side. Cap 90a/90b may include an internal seal 92 to prevent water from entering the interior of the housing 52. As seen in FIG. 4, caps 90a and 90b preferably further include an additional exterior seal 94a and 94b.

Top shell assembly 72 may also include an accessory adapter 56 for mounting an accessory. In one embodiment, the accessory adapter 56 is a threaded hole. However, any type of accessory adapter may be included on the housing 52. Moreover, any number and type of accessories can be mounted onto the housing 52, and are not necessarily limited to a location on the top shell assembly 72. Accessories that may be mounted include electronic devices, such as a GPS, chartplotter, sonar device, radio, camera, phone, tablet, or other displays and computing devices. Other accessories useful when kayaking may also be mounted.

The hull of the kayak typically includes at least one thwart 40 adjoining the sidewalls inside for structural support. The housing 52 may also include a thwart head 96 having a clamp 100 capable of connecting to thwart 40. Thwart head 96 and clamp 100 are integral to the housing 52. By integrating clamp 100 with housing 52, the clamp is more reliable in repetitive stresses during use. In the embodiment shown in FIG. 3, and as best seen in FIG. 4, thwart head 96 is located on the top shell assembly 72. Thwart head 96 may also span the entire width of the top shell assembly 72 in order to provide sufficient reliability.

Figure 6:
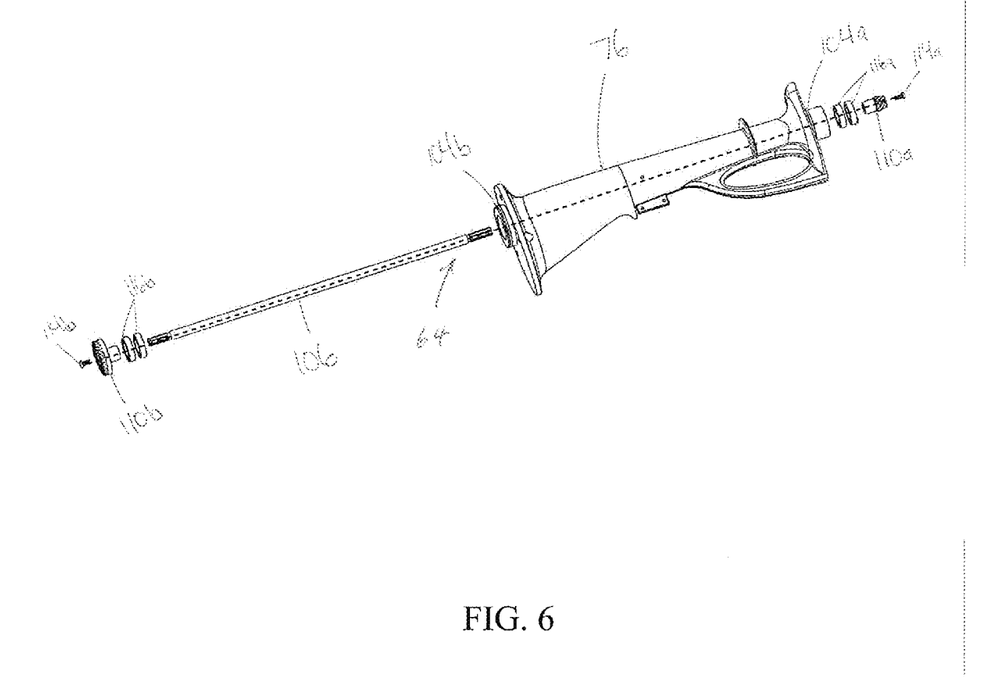
FIG. 6 is an exploded view of a center shell assembly of the kayak propulsion unit of FIG. 3.

FIG. 6 is an exploded view of the center shell assembly 76 from the embodiment in shown in FIG. 3. Center shell assembly 76 may be a fairing, or any other type of structure. In this three piece shell assembly embodiment, center shell assembly 76 may further include gaskets to connect it to the top shell assembly 72 and the bottom shell assembly 74. In one embodiment, the gaskets are O-rings 104a and 104b. As seen in FIG. 3, center shell assembly 76 may also include an anti-ventilation plate 105.

As shown in the embodiment in FIG. 6, the center shell assembly 76 includes transmission 64. In one embodiment, transmission 64 may include an axle 106 with an upper and lower end. Each end of axle 106 may include a transmission gear 110a, 110b. Transmission gears 110a and 110b may be attached to axle 106 through screws 114a and 114b. Transmission 64 may further include one or more transmission bearings 116a and 116b. Transmission gear 110a, located at the upper end of axle 106, mates to gear 82 within the cavity of top shell assembly 72. Transmission gear 110b, located at the bottom end of axle 106, mates to a propeller gear 120 of the propeller assembly 66.

Figure 7:
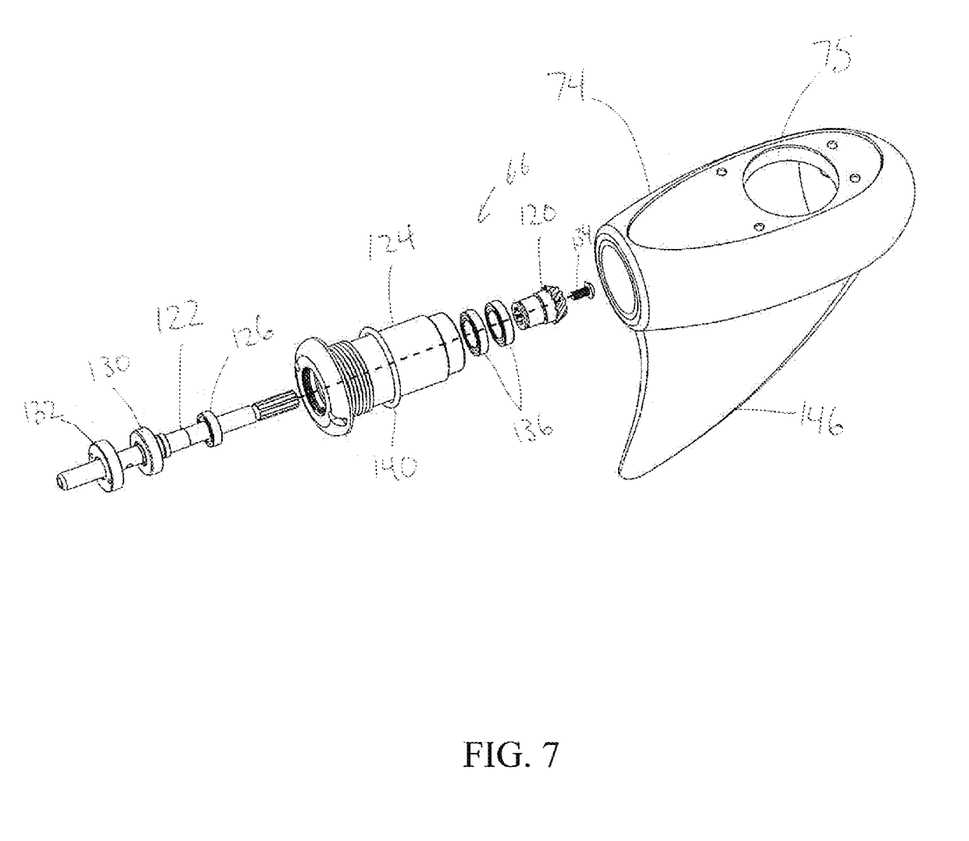
FIG. 7 is an exploded view of a bottom shell assembly of the kayak propulsion unit of FIG. 3.

FIG. 7 shows an exploded view of the bottom shell assembly 74 from the embodiment in shown in FIG. 3. The interior of housing 52 may extend into bottom shell assembly 74 through interior cavity 75, wherein at least a portion of the propeller assembly 66 is in the interior of the bottom shell assembly 74. Propeller assembly 66 may include a propeller shaft 122 having a proximal and distal end in relation to center shell assembly 76. Propeller shaft 122 inserted into a lower cartridge 124. Propeller shaft 122 may further include a bearing 126 and a cartridge seal 130. A locknut 132 may be also included at the distal end of propeller shaft 122. The propeller gear 120, which mates to transmission gear 110b, is included at the proximal end of propeller shaft 122, and is attached via screw 134. At this end, propeller shaft 122 may also include one or more bearings 136. As seen in the embodiment in FIG. 7, lower cartridge 124 is inserted into bottom shell assembly 74. Lower cartridge 124 may further include an O-ring 140.

Returning to FIG. 3, the propeller 70 attaches to the distal end of propeller shaft 122. Distal end of propeller shaft 122 extends to the exterior of housing 52, such that propeller 70 mounts on the exterior of bottom shell assembly 74. Distal end of propeller shaft 122 inserts in to a center hole of propeller 70, and propeller 70 is secured to propeller shaft 122 through use of screw 142. Propeller shaft 122 may further include a shear pin 144 that threads through shaft 122 perpendicularly. Shear pins are useful for protecting components of the propeller assembly 66 and transmission 64 when propeller 70 strikes items such as rocks during propulsion of the watercraft. The bottom shell assembly 74 further includes a fin 146.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A watercraft comprising:
   a hull having a bow and a stern with opposed sidewalls extending between the bow and the stern, the hull having a cockpit between the bow and the stern,
   a propulsion device accessible from within the cockpit, the propulsion device having
      a housing with an interior and an exterior, the interior having at least two openings accessible to the exterior, the two openings each being closed with a cap having a flange with an internal seal abutting an interior face of the flange to prevent water from entering the interior of the housing and an external seal abutting an exterior face of the flange,
      an accessory adapter on the exterior of the housing for mounting an accessory,
      a pedaling assembly mounted in the interior and extending through the openings to left and right pedals,
      a transmission in the interior of the housing, the transmission connected to the pedaling assembly to transmit rotation downward from the pedaling assembly to a propeller assembly in a lower portion of the interior operably connected to the transmission and including a propeller mounted on the exterior of the housing,
   wherein pedaling the propulsion device causes the watercraft to propel through water.

2. The watercraft of claim 1 wherein the watercraft is a kayak and the hull further includes at least one thwart adjoining the sidewalls inside for structural support and the housing further includes a thwart head having a clamp connected to the thwart.

3. A watercraft as claimed in claim 1 wherein the watercraft is a kayak and further comprising a seat in the cockpit, the seat and pedals of the propulsion device being located with respect to one another so that a person sitting in the seat can pedal the pedals with his or her feet.

4. The watercraft of claim 2 wherein the clamp is integral with the housing.

5. The watercraft of claim 1 wherein the pedaling assembly includes a pedal spindle having two ends with each end inserted through a gear and a bearing and extending through the openings, each end of the pedal spindle perpendicularly connected to an inner end of a crankarm, each crankarm also having an outer end attached to one of the pedals.

6. The watercraft of claim 1 wherein the accessory adapter includes a threaded hole.

7. The watercraft of claim 1 further comprising an accessory, wherein the accessory is an electronic device.

8. The watercraft of claim 1 wherein the housing is comprised of top, bottom, and central shell assemblies.

9. The watercraft of claim 8 wherein the central shell assembly extends through a hole in the cockpit such that the top shell assembly is above the hole in the cockpit and the bottom assembly is below the hole in the cockpit.

10. The watercraft of claim 8 wherein each shell assembly has a top and a bottom wherein the top of the center shell assembly connects to the bottom of the top shell assembly and the bottom of the center shell assembly connects to the top of the bottom shell assembly.

11. The watercraft of claim 8 wherein the accessory adapter is located on the top shell assembly.

12. The watercraft of claim 8 wherein the openings through which the pedaling assembly extends are located on the top shell assembly.

13. The watercraft of claim 8 wherein the watercraft is a kayak and the hull further includes at least one thwart adjoining the sidewalls inside for structural support, the housing further including a thwart head having a clamp connected to the thwart, the thwart head spanning the entire width of the top shell assembly.

14. The watercraft of claim 8 wherein the interior extends into the bottom shell assembly and at least a portion of the propeller assembly is in the interior of the bottom shell assembly.

15. The watercraft of claim 14 wherein the propeller assembly comprises a propeller shaft having a proximal and distal end in relation to the center shell assembly, with a propeller gear attached to the proximal end and the propeller attached to the distal end.

16. The watercraft of claim 15 wherein the transmission comprises an axle with an upper and lower end, each end of the axle including a transmission gear and a transmission bearing that is inserted through the axle, the transmission gear located at the upper end of the axle mating to the gear within the cavity of the top shell assembly, the transmission gear located at the bottom end of the axle mating to the propeller gear.

17. The watercraft of claim 8 wherein the transmission is in the interior of the central shell assembly.

18. A watercraft comprising:
   a hull having a bow and a stern with opposed sidewalls extending between the bow and the stern, at least one thwart adjoining the interior sidewalls for structural support, the hull having a cockpit between the bow and the stern, the cockpit including a seat and a propulsion device, the propulsion device having a housing with an interior and an exterior, the housing comprising a top, bottom and central shell assembly, each shell assembly having a top and a bottom wherein the top of the center shell assembly connects to the bottom end of the top shell assembly and the bottom of the center shell assembly connects to the top end of the bottom shell assembly, the central shell assembly inserted through a hole in the cockpit such that the top shell assembly is above the hole and the bottom assembly is below the hole,
   the top shell assembly having a threaded hole for connecting at least one accessory and a thwart head having a clamp spanning the entire width of the top shell assembly connected to the thwart, the clamp integral with the top shell assembly, the interior of the top shell assembly further including at least two openings accessible to the exterior, the interior of said top shell assembly containing a gear and two bearings with a pedal spindle inserted through said gear and bearings within said cavity, each opening closed with a cap having an internal seal to prevent water from entering the interior of the housing, the pedal spindle having two opposed ends with each end connected to a crankarm, each crankarm having an inner and outer end wherein the outer end is attached to a pedal, the pedals diametrically opposed to one another, the bottom shell assembly housing at least a portion of a propeller assembly in its interior, the propeller assembly comprising a propeller shaft having a proximal and distal end in relation to the center shell assembly, with a propeller gear attached to the proximal end and a propeller attached to the distal end that is installed on the exterior, the bottom shell assembly having an integrally formed rudder on the bottom of said shell assembly's exterior, and a transmission located within the interior of the central portion, the transmission comprising an axle with an upper and lower end, each end of the axle including a transmission gear and a transmission bearing that is inserted through the axle, the transmission gear located at the upper end of the axle mating to the gear within the cavity of the top shell assembly, the transmission gear located at the bottom end of the axle mating to the propeller gear, wherein pedaling the propulsion device causes the propeller to rotate and propel the watercraft in water.

19. A watercraft comprising:
a hull having a bow and a stern with opposed sidewalls extending between the bow and the stern, the hull having a cockpit between the bow and the stern,
a propulsion device accessible from within the cockpit, the propulsion device having
a housing with an interior and an exterior, the interior having at least two openings accessible to the exterior, the two openings each being closed by a cap having a flange with an internal seal abutting an interior face of the flange and an external seal abutting an exterior face of the flange to prevent water from entering the interior of the housing,
a pedaling assembly mounted in the interior and extending through the cap and the openings to left and right pedals,
a transmission in the interior of the housing, the transmission connected to the pedaling assembly to transmit rotation downward from the pedaling assembly to a propeller assembly in a lower portion of the interior operably connected to the transmission and including a propeller mounted on the exterior of the housing,
wherein pedaling the propulsion device causes the watercraft to propel through water.

20. A watercraft as claimed in claim 1, wherein the accessory adapter faces upward on top of the housing as the propulsion device is mounted in the cockpit.

* * * * *